United States Patent [19]

Woodside

[11] Patent Number: 4,994,682

[45] Date of Patent: Feb. 19, 1991

[54] FIBER OPTIC CONTINUOUS LIQUID LEVEL SENSOR

[75] Inventor: Shane H. Woodside, Halifax, Canada

[73] Assignee: Focal Technologies Incorporated, Nova Scotia, Canada

[21] Appl. No.: 354,112

[22] Filed: May 19, 1989

[51] Int. Cl.$^5$ ............................................. G01N 15/06
[52] U.S. Cl. ................................. 250/577; 250/902; 73/293
[58] Field of Search .............. 250/902, 903, 905, 577; 73/293; 356/133, 135, 136, 137

[56] References Cited

U.S. PATENT DOCUMENTS

| | | | |
|---|---|---|---|
| 3,192,392 | 6/1965 | Reed | 250/903 |
| 4,164,077 | 8/1979 | Thomas | 250/577 |
| 4,870,292 | 9/1989 | Alpert et al. | 250/577 |
| 4,878,383 | 11/1989 | Wiegand, Jr. et al. | 73/293 |

FOREIGN PATENT DOCUMENTS 1102151 6/1981 Canada.

OTHER PUBLICATIONS

"Fiber Optic Fluid Level Sensor", Belkerdid and Ghandeharioun & Brennan, SPIE, vol. 566, Fiber Optic and Laser Sensors III (1985), pp. 153–158.
"Experimental Investigations on Fiber Optic Liquid Level Sensors and Refractometers", Spenner et al., pp. 96–99.

Primary Examiner—David C. Nelms
Assistant Examiner—Que Tan Le
Attorney, Agent, or Firm—Jones, Tullar & Cooper

[57] ABSTRACT

A fibre optic sensor, particularly for ascertaining fluid levels, utilizes two cylindrical lightguides with regular perturbations to emit and/or accept light in a radial direction. Each waveguide is coupled to one (or more) light source and/or to one (or more) light detector. A light source such as a light emitting diode or laser diode is coupled to the lightguide which emits radially, illuminating a planar dielectric surface, which in the presence of a fluid with a low index of refraction, e.g. air, behaves as a mirror, coupling light via total internal reflection to the lightguide which accepts this light radially and channels the light to a light detector. In the presence of a fluid with a high index of refraction, for example water, at the planar dielectric surface the fluid dielectric interface becomes primarily transmissive, with relatively little light being coupled to the lightguide which accepts light radially. The optical signal received at the light detector is thus related to the depth of the planar dielectric surface which is immersed in liquid. Several different embodiments to achieve liquid level sensing, as well as a scheme for eliminating sensitivity to optical signal changes induced in the lead fibre, are disclosed.

9 Claims, 4 Drawing Sheets

FIBER OPTIC CONTINUOUS LIQUID LEVEL SENSOR

This invention relates to a method and apparatus for optically detecting a liquid level.

BACKGROUND OF THE INVENTION

Conventionally, the level of a liquid in a vessel is detected using a float with a mechanical or magnetic coupling to an external gauge, an ultrasonic or optical transducer which measures time of flight to deduce the liquid level, or a parallel wire capacitance sensor which monitors the change in the dielectric constant between the wires associated with a change in liquid level.

The application of fibre optics to level sensing in liquids is well documented. The principal advantages of this type of level sensor are its passivity, i.e. no moving or mechanical parts, and its intrinsic dielectric properties which mean no spark hazard when used with combustible fluids and virtually zero susceptibility to electromagnetic interference. The more common implementations use small prisms mounted at the end of two optical fibres, a conically shaped optical fibre tip, or a U-shaped bent optical fibre [Canadian Patent 1102151] (devices of these types are described for example in the article "Experimental Investigations on Fibre Optic Liquid Level Sensors and Refractometers" by K. Spenner et al—IEE OFS 221 pages 96-14 99). In all instances, the optical fibre probe or sensor is suspended or made to protrude into the vessel, and the potentially fragile sensor is exposed to damage by floating debris, vibration, and dynamic effects during filling. The potential for damage is increased if routine maintenance of the sensor is required due to biological or chemical fouling of the optical surface.

A more rugged point type fibre optic level sensor is described in U.S. patent application No. 07/168,481, Alpert and Snow, filed Mar. 15, 1988, now U.S. Pat. No. 4,870,292, wherein the source and detector fibres are embedded in an optically transparent substrate material, thereby providing protection for the sensor and a suitable window for cleaning.

The fibre optic sensors just described are primarily for discrete level measurement, e.g. to sense whether the vessel is empty or full or at some intermediate point. A multiplicity of such point sensors generally represents an impractical configuration for a continuous liquid level measure. A continuous measure is desirable for improved resolution in many applications. Consider the case of an aircraft fuel gauging system. The dielectric properties of the optical fibre sensor are desirable from the point of view of safety with respect to spark hazard and lightning strikes but high resolution and accuracy are also desirable so that excess fuel quantities would not have to be carried. This reduction in aircraft fuel level sensors are generally capacitance type sensors which lose accuracy when the fuel becomes laden with water and the dielectric constant is changed significantly.

Only three continuous fibre optic liquid level sensors have been found reported thus far. The first is "Fibre Optic Fluid Level Sensor" by M. Belkerdid, N. Ghanderharioun, and B. Brennan in the Proceedings of SPIE Conference 566 Fibre Optic and Laser Sensors III (1985) pages 153–158. Based on the bending or cladding loss principle, it consists of large loops of a single fibre, the loops being of ever increasing diameter, which are suspended in the liquid. Here again, the sensor packaging is not sufficiently robust for most applications.

The second is U.S. Pat. No. 4,870,292, Alpert and Snow, which uses a fluorescent doped detector fibre to collect light reflected from a source fibre in the presence of air; the light is refracted away when a fluid of higher refractive index is present. Hence the output signal is related to the fluid level.

The third is disclosed in U.S. patent application No. 07/292,111 of Dec. 30, 1988 by P. Colbourne, now U.S. Pat. No. 4,942,306. This invention uses a fluorescence doped fibre embedded in a cylindrical waveguide. The waveguide conducts light only in the absence of liquid, and hence the length of fluorescent fibre illuminated is equal to the length of the waveguide which is not immersed. The optical signal from the fluorescent fibre is thus related to the liquid level.

SUMMARY OF THE INVENTION

A simple configuration is described based on the principle of total internal reflection used in the prism and cone sensors and a geometry and packaging similar to that described by Alpert and Snow in U.S. Pat. No. 4,870,292. However, this configuration replaces the fluorescent fibre with a different form of lightguide capable of accepting light from a radial direction. Also described is a novel embodiment which eliminates the need for lenses and mirrors.

It is well known that the amount of reflection occurring at a dielectric interface is dependent on the refractive index of the dielectric medium containing the incident ray, the refractive index of the dielectric medium containing the transmitted ray, and the angle and polarization of the incident ray. The angle of the transmitted ray is related to these first three parameters by a relationship known as Snell's Law of Refraction:

$$n_1 \sin(\theta_1) = n_s \sin(\theta_t)$$

where:
  $n_1$ is the refractive index of the medium of incidence
  $n_t$ is the refractive index of the medium of transmittance
  $\theta_1$ is the angle of incidence
  $\theta_t$ is the angle of transmittance
For $n_1 > n_t$, there is a limiting angle of incidence called the critical angle $\theta_{cr}$ given by:

$$\theta_{cr} = \arc \sin(n_t/n_1)$$

All rays incident at angles greater than this critical angle undergo complete reflection at the dielectric interface. This is referred to as total internal reflection.

The continuous liquid level sensor described herein consists of a source or transmit lightguide coupled at one or both ends to an external light source, and a detector or receive lightguide which is coupled at one or both ends to an external light detector. The source lightguide accepts light at one end, and by reflection from a series of introduced perturbations in the form of notches, emits light radially along its length. The detector lightguide, similar in geometry to the source lightguide, accepts light incident from a radial direction and by reflection from notch perturbations, redirects this light into guided modes. The lightguides are embedded in, fastened to, or otherwise mounted near an optically transparent material or substrate, one face of which forms the liquid sensing surface. The transmit lightguide is mounted such that light emitted radially along its length is coupled to the liquid sensing surface. The receive lightguide is mounted such that this light when reflected off the liquid sensing surface will be incident in such a manner as to be coupled into the receive lightguide. When a fluid of low refractive index such as air is present, total internal reflection occurs at the liquid sensing surface and light is coupled from the source lightguide to the detector lightguide. When a fluid of higher refractive index such as water or gasoline is present at the liquid sensing surface, the substrate—liquid interface becomes primarily transmissive and only a small amount of light is reflectively coupled from the source lightguide to the detector lightguide. In this way, the optical signal detected from the receive lightguide is related to the height of the liquid sensing surface which is immersed.

DESCRIPTION OF THE PREFERRED EMBODIMENT

Figure 1:
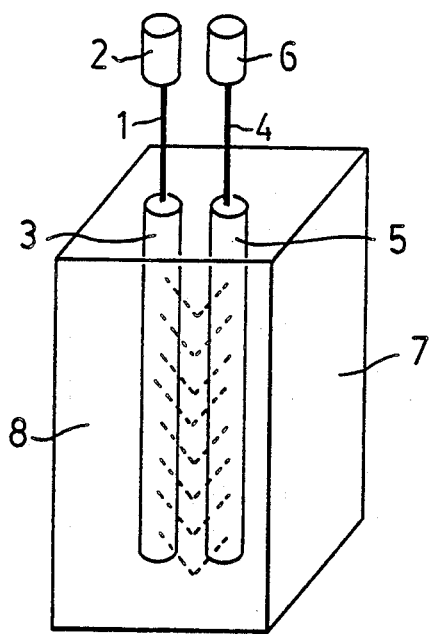
FIG. 1 is a general view of the continuous liquid level sensor described in the invention.

Referring to the drawings, in the general form of the continuous liquid level sensor shown in FIG. 1, an optical fibre 1 couples light from a light source 2 such as a light emitting diode or a laser diode to the source lightguide 3. Similarly, an optical fibre 4 couples light from the detector lightguide 5 to a light detector 6 such as a photodiode or a phototransistor. The source lightguide 3 and detector lightguide 5 are embedded in, fastened to, or otherwise mounted near, an optically transparent substrate material 7 in such a manner as to provide optical coupling from the source lightguide 3 to the detector lightguide 5 by reflection from the liquid level sensing surface 8 of the substrate material 7.

Figure 2A:
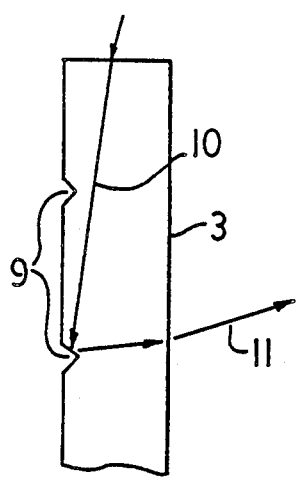
FIG. 2A is a cross section of the source lightguide, showing the manner by which light is emitted radially along its length.
Figure 2B:
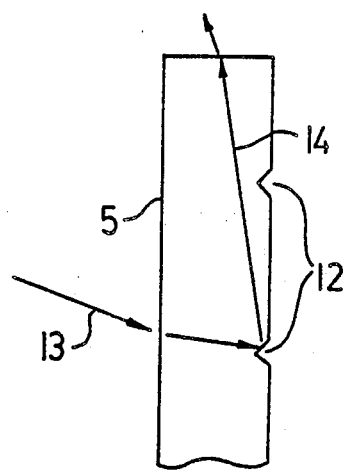
FIG. 2B is a similar view of the detector lightguide, showing the manner by which radially incident light is accepted along its length. Notches 9 and 12 in FIGS. 2A and 2B respectively are exaggerated in size for clarity of illustration.

Referring now to FIG. 2A, the source lightguide 3 is constructed of an optically transparent material such as glass or acrylic or another type of plastic in which perturbations in the form of notches 9 have been introduced. These notches may cause an internal light ray 10 to be reflected out of the lightguide in a radial direction as light ray 11. Referring now to FIG. 2B, the detector lightguide 5 is similarly constructed of an optically transparent material in which perturbations in the form of notches 12 have been introduced. These notches cause an external radially incident light ray 13 to be redirected as light ray 14 to a guided mode of the detector lightguide. There could be more than one series of notches 9, 12 at different radial positions, or they could be made annular, to cause a more rapid exiting of the light. This would provide a stronger signal, albeit over a shorter height.

Referring back to FIG. 1, the light source 2 couples light via the optical fibre 1 to the source lightguide 3, which emits this light radially along its length at each notch or perturbation 9. A given light ray incident at the liquid level sensing surface 8 in the presence of air will be reflected to the detector lightguide 5, will encounter a notch or perturbation 12, and hence will be coupled to the light detector 6 by the optical fibre 4. A given light ray incident on the liquid sensing surface 8 in the presence of liquid will be transmitted into the liquid and hence not coupled to the light detector 6. The magnitude of the optical signal is related to the length of the liquid sensitive surface exposed to air, and hence is complementarily related to the height of liquid.

Figure 3A:
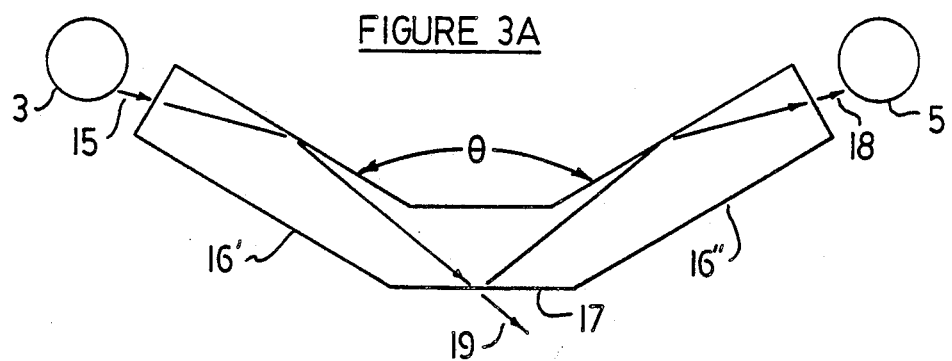
FIG. 3A shows the top view of an embodiment of the invention in which the substrate takes the form of a V-shaped optical waveguide, and shows how light is channelled along the V-shaped waveguide to and from the liquid sensing surface 17.
Figure 3B:
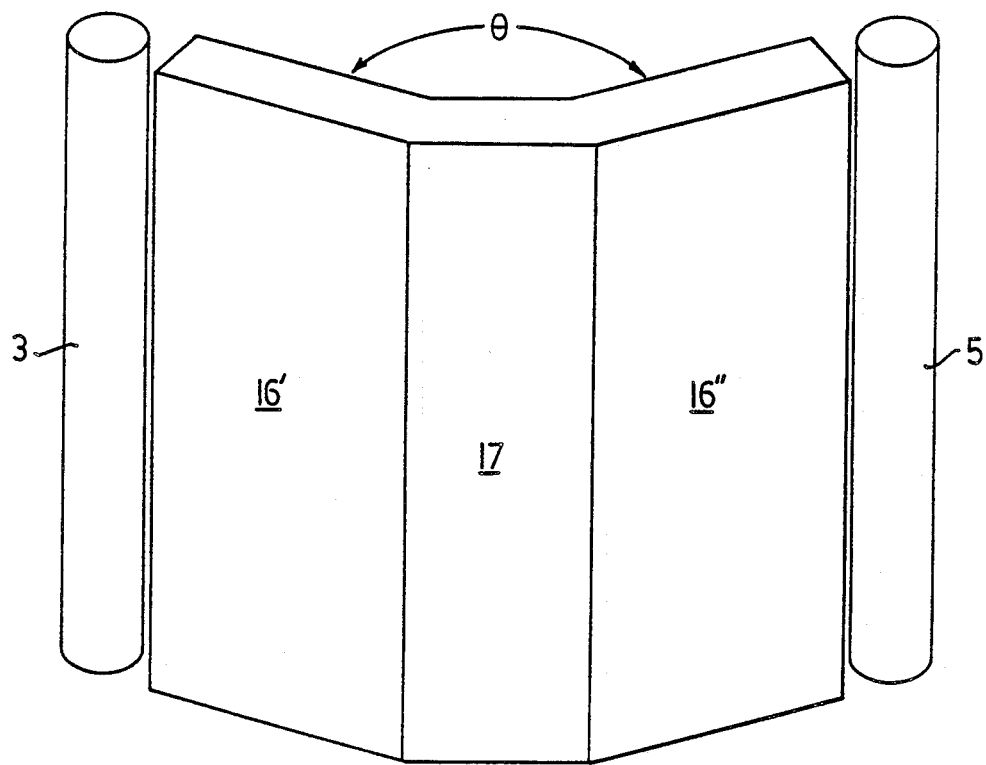
FIG. 3B is a general view of the V-shaped waveguide embodiment.

Another embodiment of this invention is depicted in FIG. 3, in which the substrate is in the form of a vertically elongated transversely V-shaped optical waveguide having arms 16', 16" and a liquid sensing surface 17. A light ray 15 exits the notched source lightguide 3 and is channelled through the waveguide arm 16' to the liquid sensing surface 17. In the presence of a lower refractive index fluid such as air at the liquid sensing interface 17, the light remains in the waveguide and is reflected along arm 16" to be incident on the notched detector lightguide 5, as light ray 18. In the presence of a higher refractive index fluid such as water at the liquid sensing surface 17, the light is primarily transmitted into the fluid such as ray 19, and hence is not detected. The waveguide 16 may be isolated from the liquid except at the liquid sensing surface 17 by an air gap or a cladding layer with a suitably low refractive index. The angle is $\theta$ chosen such that the majority of light rays incident on the liquid sensing surface will be at angles less than the critical angle for the higher refractive index fluid and greater than the critical angle for the lower refractive index fluid.

Figure 5A:
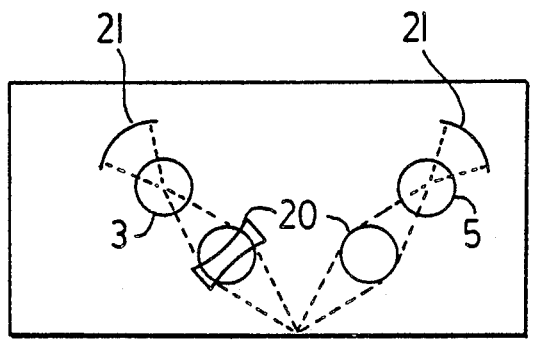
FIG. 5 shows an arrangement wherein mirrors and lenses have been added to enhance performance.
Figure 5B:
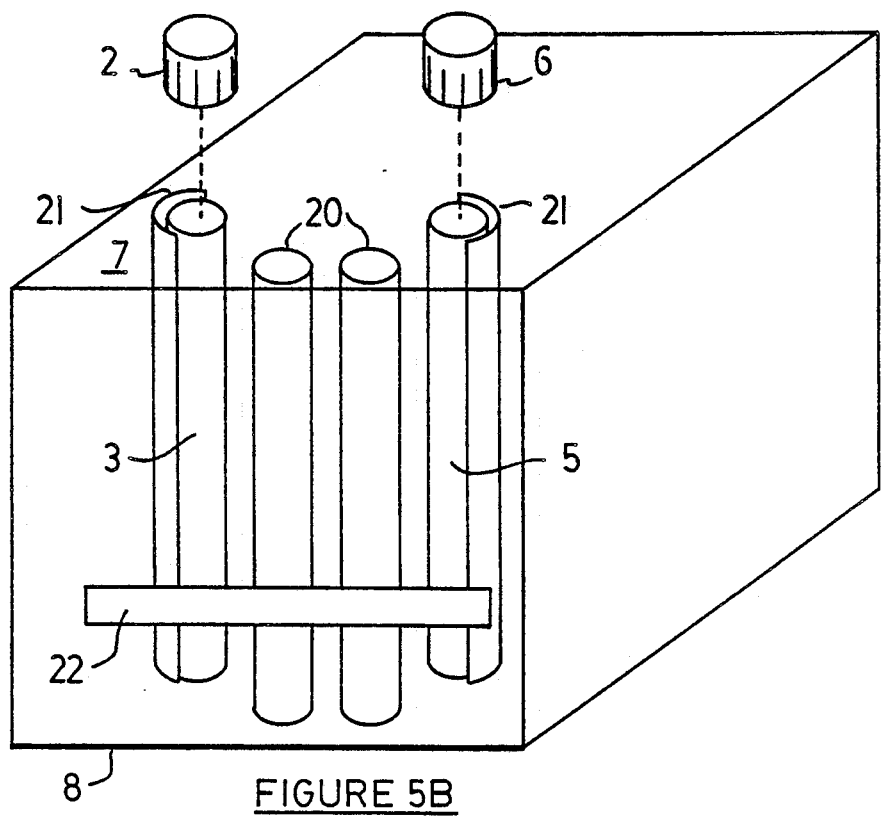

Lenses and mirrors can be used in several ways to enhance performance. The lenses 20 as shown in FIG. 5 are convex or cylindrical positive, which is suitable for the case where the refractive index of the lens is greater than that of the medium. If the reverse were true the lenses would be concave or cylindrical negative. As seen by the dashed lines in FIG. 5A, the lenses focus the light to a small area on the substrate window 8 and then to the detector waveguide 5, giving a large increase in signal strength.

The curved mirrors 21 in FIG. 5 further enhance signal strength by collecting additional light from the source waveguide 3 and directing it to the detector waveguide 5, as seen by the dashed lines in FIG. 5A. This would be especially effective if the waveguides 3 and 5 were equipped with more than one line of notches (9 and 12 in FIG. 2) or if the notches were annular.

If a portion of the continuous sensor can be protected from other than total internal reflection such as with a mirrored reflecting surface (22 in FIG. 5B) on the window interface 8 to the liquid, then a light signal offset will always be present at the light detector which can be used to indicate the integrity of the optical link from and including the light source 2 to the light detector 6. Any failure in this link will be instantly detectable thus providing a self checking feature. Placement of the reflector 22 at the base of the assembly permits it tot monitor the integrity of the sensor as well as that of the optical link.

If the bottom of the waveguide 3 is made to be reflecting, then when the fluid level falls below the bottom of the waveguide 3, that portion of the light from the source 2 which propagates along the entire length of the waveguide 3 will be reflected by the mirrored end, and propagate back up the waveguide 3. The light received at the detector waveguide 5 will thus increase abruptly due to illumination by both the downward propagating and upward propagating light in the waveguide 3 when the entire waveguide 3 is out of the fluid. If any portion of the waveguide 3 is surrounded by fluid, the light which reaches the bottom will be refracted out of the waveguide 3 and will not reach the bottom. The mirrored bottom thus can provide a large "empty tank" signal when the sensor is used to measure fluid level in a tank. A mirrored bottom in the detector waveguide 5 would further increase the "empty" signal.

The continuous level sensor described herein is an intensity-type sensor, since the intensity of the optical signal is indicative of liquid level. Intensity type sensors are sensitive to variations in source intensity, detector responsivity, and attenuation in the optical fibre leading to and from the sensor, all of which affect the detected optical intensity. It is usually impossible to discriminate between one of the changes listed and an actual change of the measured quantity. However, variations in lead fibre attenuation cannot be tolerated by the sensor. Special techniques must be used to eliminate sensitivity to lead fibre attenuation.

Techniques which have been used in the past to reduce lead fibre sensitivity include multiple pass pulses, wavelength referencing, polarization, Doppler few mode, and reference path techniques. Of these, only wavelength referencing can be easily applied to the present invention, being accompanied by the penalty of the necessary addition of various couplers and wavelength multiplexers. However, a reflection/transmission technique reported by Beheim and Anthan (*Applied Optics*, 27 p. 2767, 1988) may be modified for use with this invention with a minimum of additional complexity.

Figure 4:
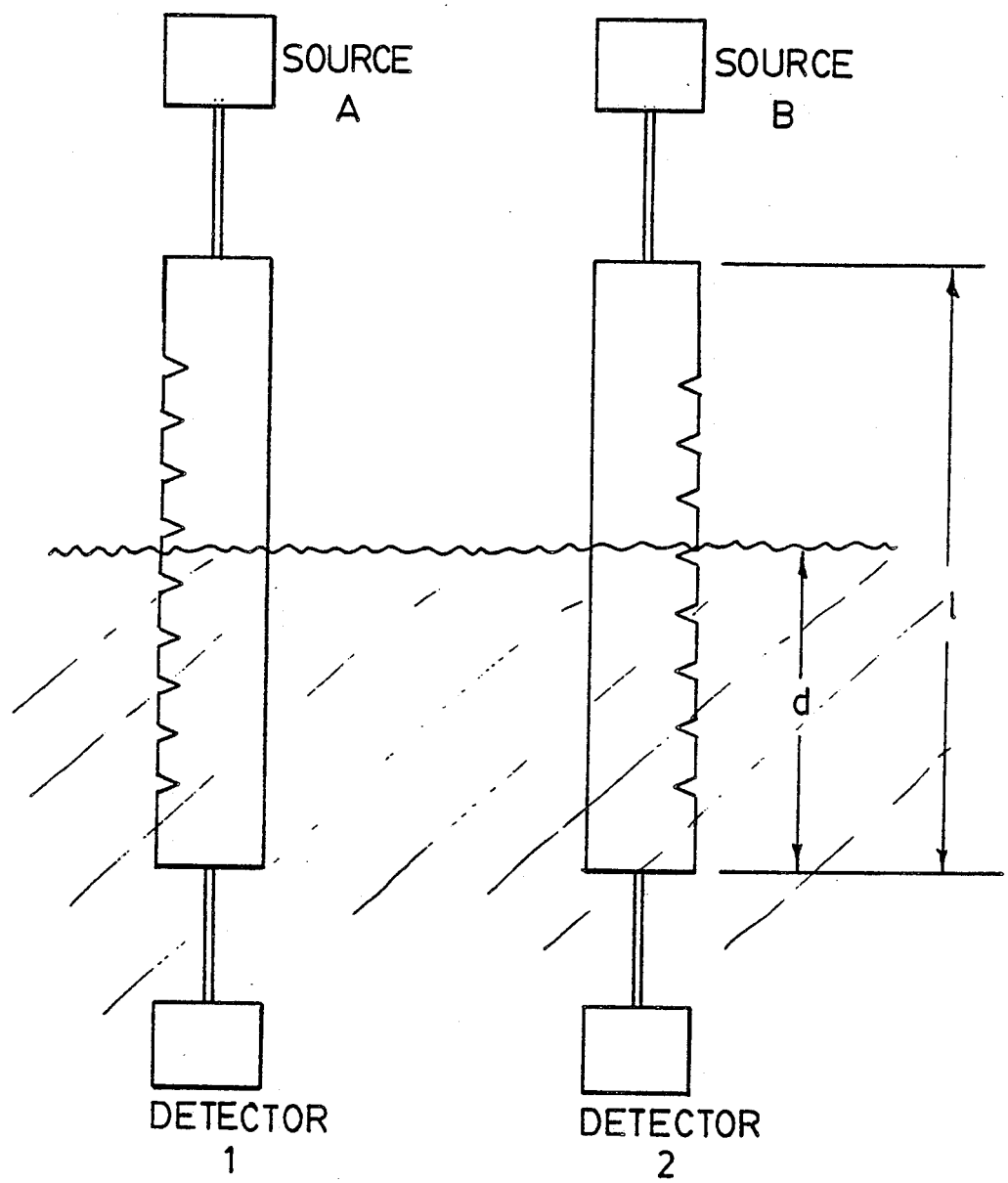
FIG. 4 shows one possible arrangement of the preferred lead insensitive scheme using two optical sources and two optical detectors coupled to the source and detector lightguides.

With this method, a minimum of two source fibres and two detector fibres are required, as well as two notched lightguides. Here neither lightguide is used exclusively as a source lightguide or a detector lightguide, but rather each acts alternately as a source and as a detector. One possible configuration is shown in FIG. 4.

To initiate a measurement, only source A is turned on, and the signal power at detector 2 and the transmitted power at detector 1, P2A and P1A respectively, are measured. Next source A is turned off and source B is turned on, giving measurements P1B and P2B respectively. The quantity $$Y = \sqrt{\frac{P2A\ P1B}{P1A\ P2B}}$$

is then calculated, which varies monotonically with liquid level and is insensitive to attenuation change in all fibres. With a few simplifying assumptions, the theoretical expression for Y is found to be:

$$Y = C(l-d)$$

where l is the active length of the notched rod sensor and d is the length of the sensor immersed in liquid. C is a constant which depends on the attenuation in the lightguides as well as the coefficient of coupling between the waveguides.

Similar results may be obtained by changing the relative locations of the input and output fibres. For example, all fibres may be placed at the top of the lightguides. This allows for more compact sensor design because fibre no longer needs to be routed around the bottom of the sensor, but it also gives a more complicated expression for the lead fibre insensitive output parameter Y.

The embodiments of the invention in which an exclusive property or privilege is claimed are defined as follows:

1. An indicating device for showing the level of fluids in a container, comprising: at least two optical fibres; one of said fibres being coupled at one end to an optical source, and at the other end to a source lightguide which emits light in a radial direction; the other fibre being coupled at one end to an optical detector, and at the other end to a detector lightguide which accepts light in a radial direction; the source lightguide and detector lightguide being oriented such that light emitted by the source lightguide is incident on a dielectric liquid sensing surface and undergoes total internal reflection in the presence of a first fluid, thus being coupled to the detector lightguide, and, in the presence of a second fluid of higher refractive index at the liquid sensing surface, the interface becomes primarily transmissive, offering relatively little reflective coupling to the detector lightguide, and where the source and detector lightguides are each similarly formed as a cylindrical optical waveguide with a plurality of notches formed therein along the length thereof.

2. A continuous level sensor for detecting the level of fluids in a container, comprising:

An optically transparent liquid sensing surface defining an interface with a fluid to be detected;

a source lightguide adjacent said surface;

a first cylindrical optical fiber coupled at a first end to a source of light and at a second end to said source light guide;

a detector lightguide adjacent said surface;

a second cylindrical optical fiber coupled at a first end to said detector lightguide and at a second end to a light detector;

said source lightguide and said detector light guide each incorporating plural notches formed along the length thereof whereby said source lightguide emits light in a radical direction and said detector lightguide accepts light in a radical direction, said source lightguide and detector lightguide being oriented with respect to each other and to said surface so that light emitted radially from said source lightguide is incident on said surface, undergoes total internal reflection in the presence of a first fluid having a first refractive index at said surface interface, and is coupled into said detector lightguide, and so that light emitted radially from said source lightguide and incident on said surface undergoes at least some transmission through said surface in the presence of a second fluid having a second refractive index which is higher than said first refractive index, whereby the amount of light received by said detector lightguide from said source lightguide is related to the relative levels of said first and second fluids at said interface.

3. The device according to claim 1 wherein a transversely V-shaped optical waveguide provides a coupling path between the source lightguide and detector lightguide via reflection from a liquid sensing surface.

4. The device according to claim 3 wherein the V-shaped waveguide is surrounded by an air gap or a cladding layer of a suitably low refractive index to isolate the V-shaped waveguide from the liquid to be measured, except at the liquid sensing surface.

5. The device according to claim 1 wherein the optical source and detector are coupled directly to the source and detector lightguides respectively to maximize optical signal power.

6. The device according to claim 1 wherein an optical source and an optical detector are provided at opposite ends, respectively, of each lightguide to provide insensitivity to variations in lead fibre attenuation, source intensity, and detector responsivity.

7. The device according to claim 1 including a generally cylindrical lens adjacent each of the source and detector lightguides to maximize optical throughput efficiency in the sensor.

8. The device according to claim 1 including a generally curved mirror adjacent each of the source and detector lightguides to maximize optical throughput efficiency in the sensor.

9. The device according to claim 7 including a generally curved mirror adjacent each of the lightguides and positioned opposite the respective cylindrical lens.

* * * * *